Sept. 27, 1949.  W. R. POLYE ET AL  2,483,350

TEMPERATURE PROBE OF THE THERMOCOUPLE TYPE

Filed March 29, 1948

INVENTORS
WILLIAM R. POLYE
WILLIAM E. BRANDAU
BY Herbert Lawins Jr.
ATTORNEY

Patented Sept. 27, 1949

2,483,350

UNITED STATES PATENT OFFICE 2,483,350

TEMPERATURE PROBE OF THE THERMOCOUPLE TYPE

William R. Polye, River Edge, and William E. Brandau, Westwood, N. J., assignors to Bendix Aviation Corporation, Teterboro, N. J., a corporation of Delaware Application March 29, 1948, Serial No. 17,676

2 Claims. (Cl. 136—4)

The present application relates to a temperature probe for use in the combustion chamber of a turbo jet or turbo-prop. engine in aircraft installation, where rapid response to changes in temperature is essential to effect a desired control function.

An object of the invention is to provide a temperature probe having a rapid response to changes in temperature and particularly adapted for use in gas streams of high temperatures and velocity such as found in the combustion chambers of jet engines.

Another object of the invention is to provide a device for temperature control having a novel shielded thermocouple providing a relatively rapid temperature responsive action with high life expectancy, despite its use in high pressure gaseous medium.

Another object of the invention is to provide a thermocouple for temperature control having a protective shield which permits a rapid response of the thermocouple to change in temperature, while at the same time providing protection to the thermocouple from the gaseous medium in which the device is immersed.

The above and other objects and features of the invention will appear more fully hereinafter from a consideration of the following description taken in connection with the accompanying drawing wherein one embodiment of the invention is illustrated by way of example.

Figures 1, 2:
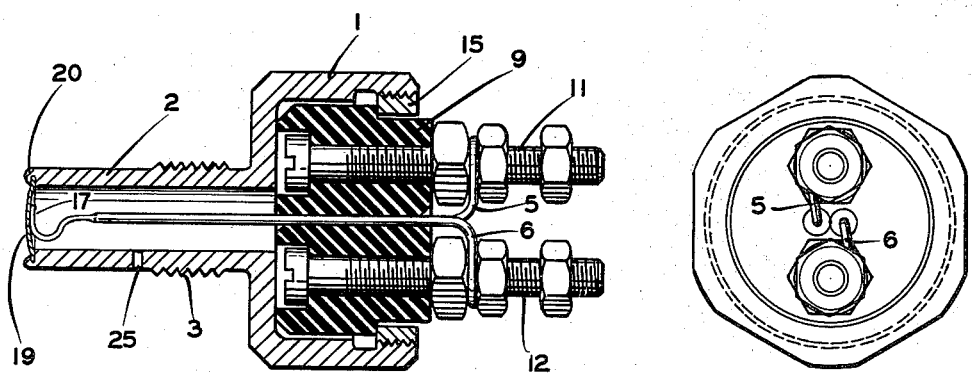
Figure 1 is a sectional view of a temperature probe embodying the present invention.
Figure 2 is an end view of Figure 1.

In the drawing of Figure 1, the temperature probe is shown as including a housing 1 formed of a suitable non-corrosive metal having a tube-like neck portion 2 projecting therefrom for insertion into the combustion chamber of a jet engine. Screw threads 3 are provided on the neck portion 2 for engagement with corresponding screw threads formed in the wall of the combustion chamber.

Two thermocouple wires 5 and 6 are mounted in the housing 1 by an insulating block 9 which may be formed of a suitable ceramic material. The block 9 holds terminal screws 11 and 12 to which are connected the thermocouple wires 5 and 6 respectively. The block 9 is fastened in the housing 1 by a collar 15 screw threadedly engaged in suitable interval threads formed within the housing 1.

The wires 5 and 6 extend through the insulating block 9 and into the neck portion 2. The wires 5 and 6 form a relatively fast Chromel-Alumel thermocouple consisting of about .003 of an inch thick ribbons which are flattened on the ends by rolling or beating and joined to form a junction 17.

The junction 17 is spot welded to a thin metal diaphragm like shield or target 19 formed of a metal having great strength at high temperatures such as platinum, platinum rhodium, gold palladium, or a high nickel chrome alloy known commercially as "Inconel."

The shield 19 is preferably formed about .002 of an inch thick and is strongly supported in the end of the neck 2. The end of the tube like neck 2 is rolled at 21 over the circumferential edge of the shield 19 so as to secure the shield 19 in position.

The inner side of the diaphragm or shield 19 is open to the pressure in the combustion chamber through a port 25 formed in the wall of the tube or neck 2. It will be seen then that the pressures acting at opposite sides of the shield 19 will be balanced.

The thin shield or diaphragm 19 has a relatively large area and low heat capacity which is ideal for rapid heat transfer between diaphragm 19 and the hot gas within which the tube 2 is immersed. The junction 17 is light and adds little heat capacity to the system. Protection of the thermocouple 5 and 6 is thus provided without serious interference with the speed of response to change of temperature.

The D. C. current produced by the thermocouple 5 and 6 may be converted to a suitable A. C. signal, in a manner well known in the art, to control a servo-motor and thereby regulate the flow of fuel to the combustion chamber of a jet engine or position suitable cooling doors for continuous temperature control.

Although only one embodiment of the invention has been illustrated and described, various changes in the form and relative arrangements of the parts may be made to suit requirements.

What is claimed is:

1. In a temperature probe including a housing having a tubular neck, a thermocouple extending through said tubular neck and an insulating block mounted in said housing for supporting one end of said thermocouple; the improvement comprising a relatively thin shield-like diaphragm positioned in said tubular neck at one end thereof, said diaphragm formed of a metal having relatively great strength at high temperatures, an end of said thermocouple welded to said diaphragm, and said tubular neck having a port opening the interior of the tubular neck to the exterior fluid pressure so as to balance the fluid pressures acting at opposite sides of said diaphragm.

2. A temperature probe comprising, in combination, a housing, a tubular neck projecting from said housing for insertion into a high pressure gaseous medium, an insulator block mounted in said housing, a pair of thermocouple wires carried by said block and projecting into said tubular neck, a relatively thin shield-like diaphragm positioned in said tubular neck across the free end thereof, said diaphragm formed of a metal having relatively great strength at high temperatures, said thermocouple wires welded together at said diaphragm to form a junction, and said tubular neck having a port to open the interior of the tubular neck to the high pressure exterior gaseous medium so as to balance the fluid pressures acting at opposite sides of the diaphragm.

WILLIAM R. POLYE.
WILLIAM E. BRANDAU.

REFERENCES CITED

The following references are of record in the file of this patent:

UNITED STATES PATENTS

| Number | Name | Date |
|---|---|---|
| 1,894,109 | Marcellus | Jan. 10, 1933 |
| 2,156,853 | Huggins | May 2, 1939 |
| 2,368,937 | McGillin et al. | Feb. 6, 1945 |

OTHER REFERENCES

Roeser et al., J. Research, Bur. Stds. vol. 5 (1930), page 795.

Hawkins et al., Trans. A. S. M. E. vol. 57 (1935), page 397.